United States Patent [19]
Fosler et al.

[11] Patent Number: 5,914,919
[45] Date of Patent: Jun. 22, 1999

[54] SWITCHING BETWEEN AND SIMULTANEOUS CONTROL OF MULTIPLE ACCESSORS BY ONE OF DUAL LIBRARY MANAGERS

[75] Inventors: Christine Lynette Fosler; F. David Gallo, both of Tucson, Ariz.

[73] Assignee: International Business Machines Corporation, Armonk, N.Y.

[21] Appl. No.: 08/961,135

[22] Filed: Oct. 30, 1997

[51] Int. Cl.[6] .................................................. G04B 19/24
[52] U.S. Cl. .............................................................. 369/34
[58] Field of Search ................................. 369/34, 36, 37, 369/38, 39, 40, 30, 178

[56] References Cited

U.S. PATENT DOCUMENTS

| 5,513,156 | 4/1996 | Hanaok et al. | 369/34 |
| 5,703,843 | 12/1997 | Katsuyama et al. | 369/34 |
| 5,768,141 | 6/1998 | Hanaoka et al. | 369/34 |

FOREIGN PATENT DOCUMENTS

| 01-318113 | 12/1989 | Japan . |
| 04-174019 | 6/1992 | Japan . |
| 04-23118 | 6/1992 | Japan . |
| 5-258432 | 10/1993 | Japan . |

*Primary Examiner*—Tan Dinh
*Attorney, Agent, or Firm*—John H. Holcombe; Robert M. Sullivan

[57] ABSTRACT

An automated data storage library is disclosed for quickly switching to a second accessor when a first accessor fails. Either the first or the second accessor may be designated an active accessor and the other a standby accessor. The library includes first and second library managers, one designated an active library manager and the other a standby library manager, each of the library managers interconnected with one of the accessors for operating the interconnected accessor, and each interconnected with the other of the accessors for operating the interconnected other accessor. The active library manager may operate the first accessor as an active accessor and, upon the first accessor becoming unavailable, immediately switches to operate the second accessor as the active accessor and allows maintenance and servicing of the first accessor simultaneously with operation of the second accessor.

11 Claims, 3 Drawing Sheets

SWITCHING BETWEEN AND SIMULTANEOUS CONTROL OF MULTIPLE ACCESSORS BY ONE OF DUAL LIBRARY MANAGERS

TECHNICAL FIELD

This invention relates to automated data storage libraries which transport portable data storage media between storage slots and data storage drives, and, more particularly, to multi-accessor automated data storage libraries wherein the accessors individually can be made active or can be placed on standby.

BACKGROUND OF THE INVENTION

Automated data storage libraries are known for providing cost effective access to large quantities of stored data. Generally, data storage libraries include a large number of storage slots on which are stored portable data storage media. The typical portable data storage media is a tape cartridge or an optical cartridge. One (or more) accessor typically accesses the data storage media from the storage slots and delivers the accessed media to a data storage drive for reading and/or writing data on the accessed media Suitable electronics both operate the accessor and operate the data storage drives to transmit and/or receive data from an attached on-line host computer system.

In a conventional automated data storage library, the storage slots are arranged in a planar orthogonal arrangement forming a "wall" of storage slots for holding data storage media. The plane may be a flat plane, or may be a cylindrical plane. To double the storage capacity, two "walls" of storage slots may be provided on either side of the accessor.

A number of different companies manufacture automated data storage libraries today, each model displaying various different features. One example is the IBM 3494 Data Storage Library. Some of the automated data storage libraries have dual or multiple accessors to provide a level of redundancy, in that, one accessor is the "active" accessor and the other may take over the accessor function and be the active accessor.

In many conventional libraries, one of the accessors is always the active accessor, and the other(s) is always spare. For example, in a dual accessor automated data storage library, the active accessor conducts all of the operations to access and move the data storage media, and the other accessor is the spare and is moved out of the active operation area. In other conventional libraries, the accessors may share the active operation and no accessors are spare. In some of the dual accessor libraries, for example, that described in U.S. Pat. No. 5,513,156, Hanaoka et al., both accessors are operated simultaneously by a single accessor controller, while another accessor controller is spare. The patent assumes that all accessors are constantly available.

Occasionally, an accessor may become unavailable, for example, if a component of the accessor must be replaced or repaired. In the typical library, the unavailable accessor is moved offline so that maintenance can be effected, for example, as described in Japan PUPA 4-23118. Often, it would be helpful if the unavailable accessor were exercised to diagnose the problem or to identify that the repair or replacement is correct. For example, in Japan PUPA 1-318113, the library manager or controller conducts a diagnosis program while the accessor is on-line. In such a case, the normal operation of the accessor and therefore of the library is suspended while the diagnosis is conducted.

SUMMARY OF THE INVENTION

An object of the present invention is to allow servicing and maintenance to be conducted on an active accessor upon its becoming unavailable, while transferring the library operation to a spare accessor without significant delay.

An automated data storage library is disclosed for quickly switching to a second accessor when a first accessor fails. Either the first or the second accessor may be designated an active accessor and the other a standby accessor. The library includes first and second library managers, one of the library managers designated an active library manager and the other a standby library manager, each of the library managers interconnected with one of the accessors for operating the interconnected accessor, and each interconnected with the other of the accessors for operating the interconnected other accessor. The active library manager may operate the first accessor as an active accessor and, upon the first accessor becoming unavailable, immediately switches to operate the second accessor as the active accessor and allows maintenance and servicing of the first accessor simultaneously with operation of the second accessor.

Upon completion of the maintenance or servicing of the first accessor, the active library manager, which conducted the servicing, informs the standby library manager of the operational status of components of the first accessor as the result of the maintenance and service so that the standby library manager can update its system file with the information.

For a fuller understanding of the present invention, reference should be made to the following detailed description taken in conjunction with the accompanying drawings.

DETAILED DESCRIPTION OF THE INVENTION

Figure 1:
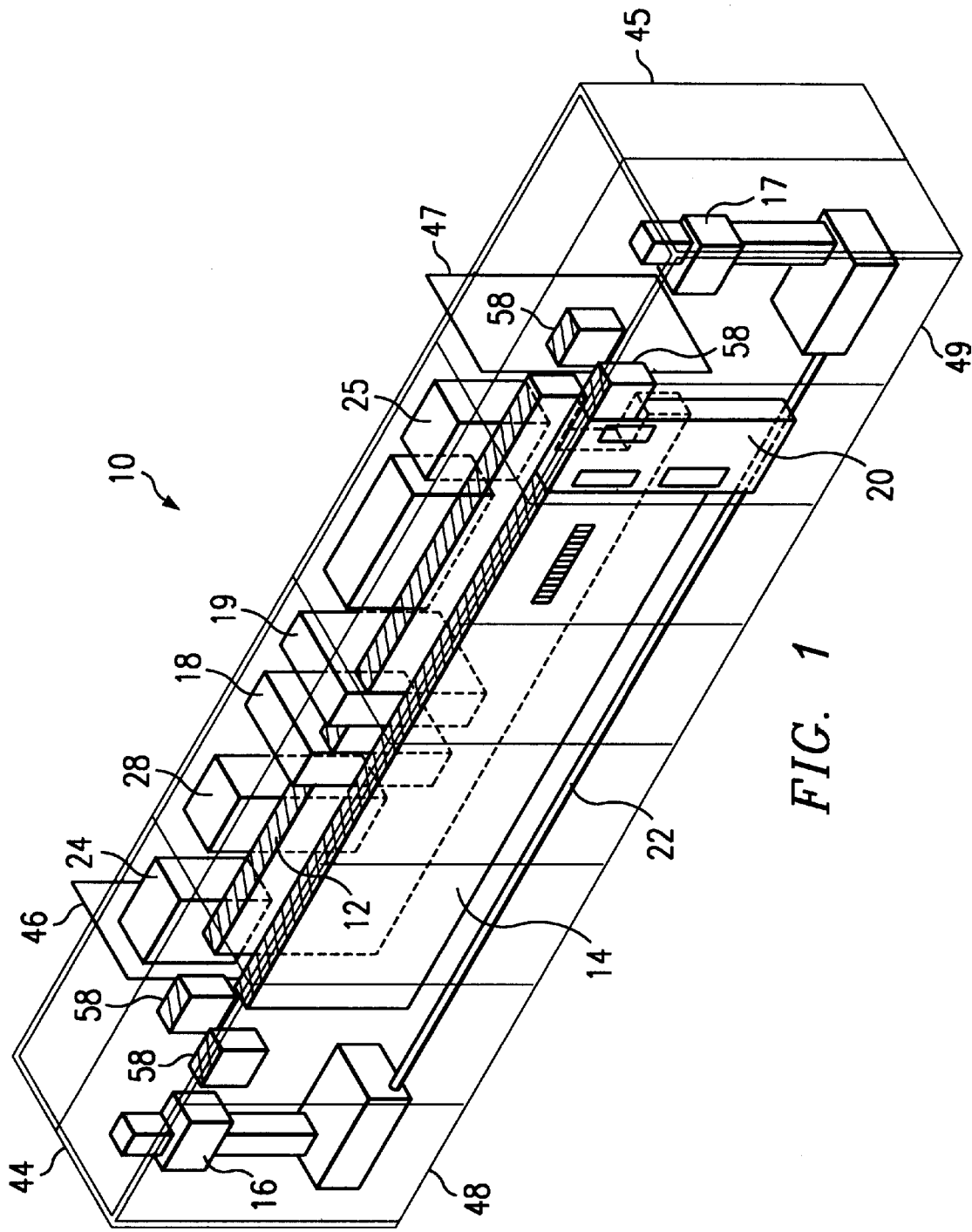
FIG. 1 is a diagrammatic representation of an automated data storage library in accordance with the present invention.

Referring to FIG. 1, an automated data storage library 10 is illustrated having an inner "wall" of storage slots 12 and an outer wall of storage slots 14, which store data storage media. Typically, the data storage media are self-contained within a portable container, or cartridge. Examples of such data storage media include magnetic tape cartridges or cassettes, optical disk cartridges of various types, including ROM, WORM and rewritable, and in various formats For universal reference to any of these types of media, the terms "data storage media" or "media" are used herein.

The library of the present invention is a multi-accessor library, the embodiment of the present invention illustrated in FIG. 1 having two accessors 16 and 17. An accessor is a robotic device which accesses the data storage media from the storage slots 12 and 14 and delivers the accessed media to data storage drives 11 and 19 for reading and/or writing data on the accessed media and returns the media to storage slots 12 and 14. A media import/export port 20 may be provided for insertion or retrieval of data storage media into or out of the library. In the illustrated embodiment, the accessors 16 and 17 run on a rail 22 in an aisle between the inner wall of storage slots 12 and the outer wall of storage slots 14.

In the illustrated embodiment, dual library managers 24 and 25 are provided to manage the positioning and access of the accessors 16 and 17 to transport data storage media between storage slots 12 and 14, import/export port 20 and data storage drives 18 and 19.

An operator input station 28 is provided for allowing an operator to communicate with the automated data storage library.

Figure 2:
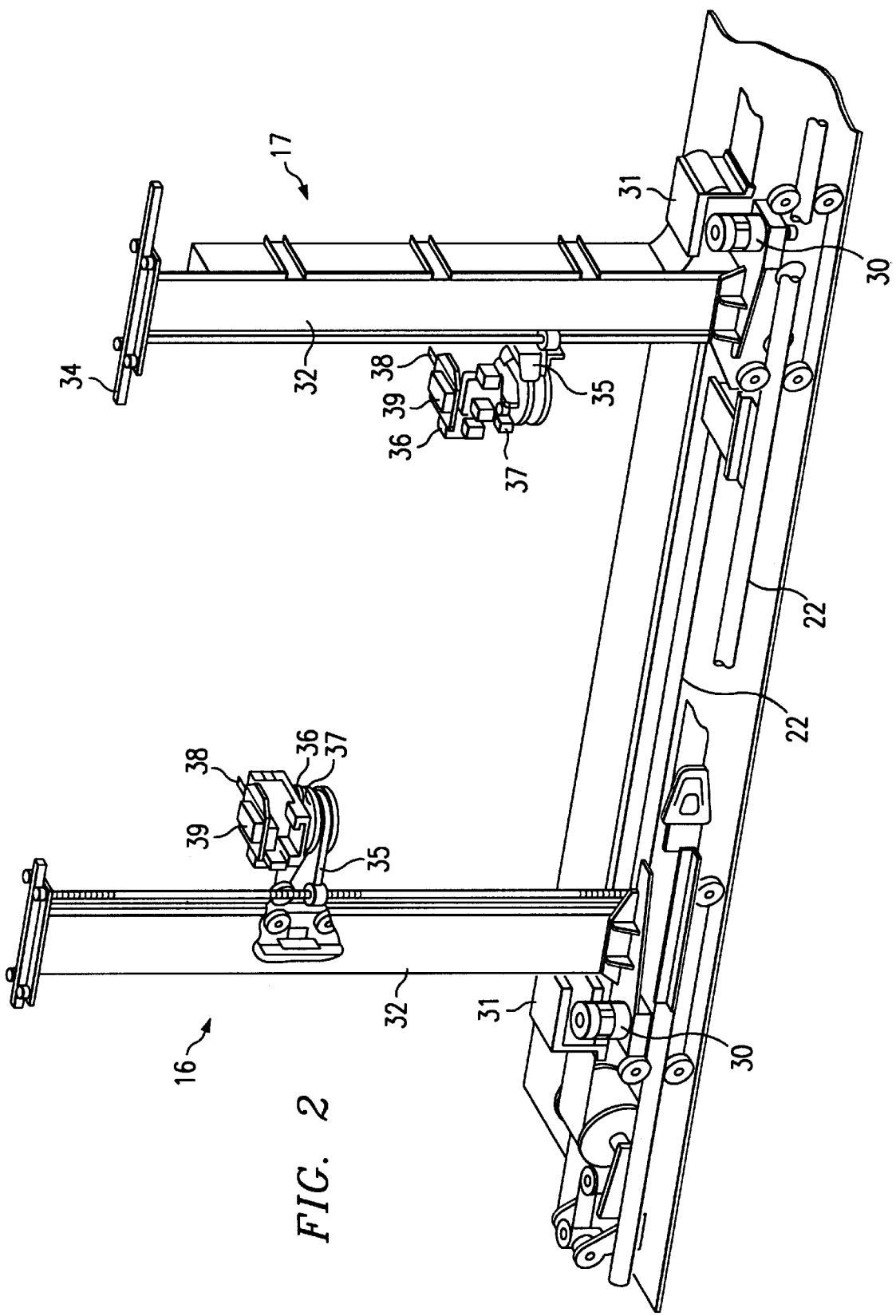
FIG. 2 is a perspective view illustration of the accessors of the automated data storage library of FIG. 1.

The accessors 16 and 17 are illustrated in greater detail in FIG. 2. The accessors run on the rails 22 along the library aisle by motors 30 in running servo sections 31. A pillar 32 is vertically attached to each of the running sections 31 of the accessors and rides in top rail 34 to provide vertical stability. Robotic manipulators 36 are mounted on lifting servo sections 35 which can move vertically along the pillars 32.

In the embodiment illustrated in FIG. 2, each of the robotic manipulators 36 includes as components, two grippers 37 and 38 and a scanner 39. The grippers 37 and 38 are at opposite sides of the manipulator 36 and can access media at either storage slots 12 or 14 in FIG. 1, and the manipulator 36 can rotate to provide the grippers on the opposite sides. Thus, one gripper can grip a data storage medium at an outside storage slot 14 of FIG. 1 and be rotated to deliver the data storage medium to a data storage drive 18 at the inside of the library. The scanners 39 can read storage information, such as bar code data, from the data storage media or from locations on the library to identify the media or to identify the location of the accessor in the library.

An example of an automated data storage library 10 is the IBM 3494 Data Storage Library, which stores magnetic tape cartridges.

Typically, the library manager 24 or 25 comprises a data processor and suitable data memory and data storage capability to control the operation of the library 10. Specifically, the library manager 24 or 25 controls the actions of the robot accessors 16 and 17. An example of dual library managers 24 and 25 are described in coassigned U.S. Pat. No. 5,524,304, Carlson et al. The conventional library manager 24 or 25 is interconnected through a provided interface to a host processor (not shown), which provides commands requesting access to particular data storage media or to media in particular storage slots. Commands for access to data or to locations on the data storage media and information to be recorded on, or to be read from, selected data storage media are typically transmitted directly between the drives 18–19 and the host. The library manager 24 or 25 is typically provided with a database, which includes tables and programs.

Figure 3:
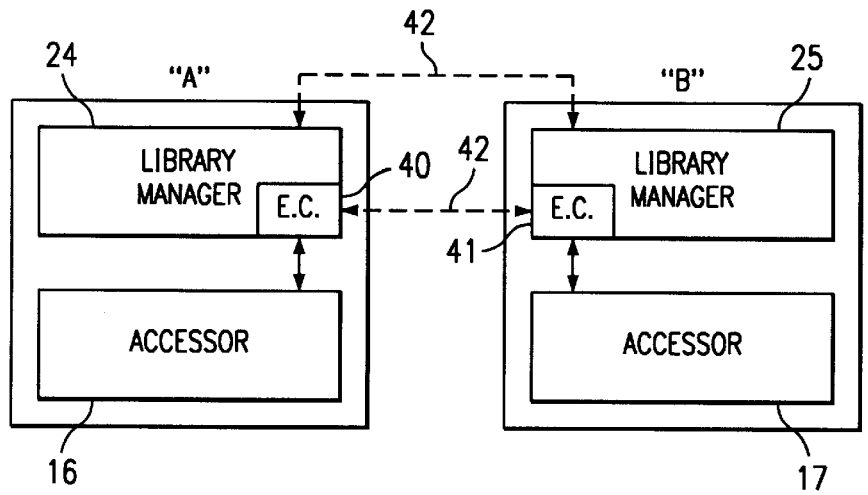
FIG. 3 is a block diagram of the library managers and accessors of the automated data storage library of FIG. 1.

Referring additionally to FIG. 3, in one embodiment, library manager 24 is associated with accessor 16 and library manager 25 is associated with accessor 17. The library manager 24 and associated accessor 16 may be located at one end of the library aisle and designated the "A" library manager and "A" accessor. Similarly, the library manager 25 and associated accessor 17 are at the opposite end of the library aisle and designated the "B" library manager and "B" accessor. The accessor 16 is called the "local" accessor with respect to library manager 24. The accessor 17 is called the "remote" accessor with respect to library manager 24. Similarly, accessor 17 is called the "local" accessor and accessor 16 is called the "remote" accessor with respect to library manager 25.

Library manager 24 includes an execution coordinator 40 which provides communication with accessor 16. The library manager processor and execution coordinator may be housed together with the accessor servo controller and DI/DO card, as is illustrated in FIG. 3. The library manager 24 and execution coordinator 40 are interconnected with library manager 25 and its associated execution coordinator 41 over a communication link 42. The communication link 42 may comprise, e.g., a conventional Ethernet link.

In accordance with the present invention, one of the accessors is designated as the "active" accessor. In one embodiment, only the active accessor has authorization to be in the aisle and handles all of the operations of the library. This sole authorization may also be called "full aisle mode". In a dual accessor library, in full aisle mode, the accessor that is not servicing aisle requests, is the "standby" accessor. If the standby accessor is capable of performing the functions of an active accessor, it is considered to be "available" in "hot standby mode". If the standby accessor is not capable of performing the functions of an active accessor, it is considered to be "unavailable". Referring to FIG. 1, the standby accessor is moved to the "service" or "standby" areas 44 and 45 at an end of the library and out of the aisle.

While in one of the standby areas or service bays 44 or 45, as shown in FIG. 1, a barrier door 46 or 47 may be extended into the aisle to isolate the standby accessor. Isolation of the standby accessor prevents interference between the operation of the active accessor and the servicing and maintenance of the standby accessor. Door 48 or door 49 may be opened to allow an operator or service representative to gain physical access to the standby accessor 16 or 17 in service bay 44 or 45.

One of the library managers 24 or 25 is designated the "active" library manager and the other is the "standby" library manager. The active library manager operates the active accessor, while the standby library manager and standby accessor are normally in hot standby mode. As described in the '304 patent, the active library manager may periodically update the standby library manager so that the standby library manager may become the active library manager, if needed, for example, if the active library manager fails. Referring to FIG. 3, the "A" library manager 24, if it is designated as the active library manager, may operate the local "A" accessor 16 as the active accessor, if it is so designated In the typical case, the local accessor is controlled by the local library manager since the accessor cards are located in the same accessor servo controller and DI/DO card. In the instant invention, the local library manager 24 is capable of operating the remote "B" accessor 17 as the active accessor, if it is so designated. The execution coordinator 40 provides communication between library manager 24 and accessor 16, employing link 42 and execution coordinator 41.

The same is true of the "B" library manager 25, if it is the designated active library manager, in which case either the local "B" accessor 17 or the remote "A" accessor 16 may be the designated active accessor.

At times, an accessor can fail, becoming unavailable, and require servicing. If the active accessor fails, for example, if it has insufficient components to work properly, the hot standby accessor must be made active. Such a failure in the present example would be if both grippers 37 and 38, or the running servo section 31 or the lifting servo section 35 were to fail.

In the present invention, when such a failure occurs, rather than switch to the standby accessor and its local standby library manager, an immediate switch of accessors only is made, while the active library manager additionally still maintains control of the now unavailable accessor. The immediate transfer of control of the standby accessor to the active library manager provides an immediate capability of carrying out the command queue of the active library manager without the need to bring a standby library manager up to date.

Figure 4:
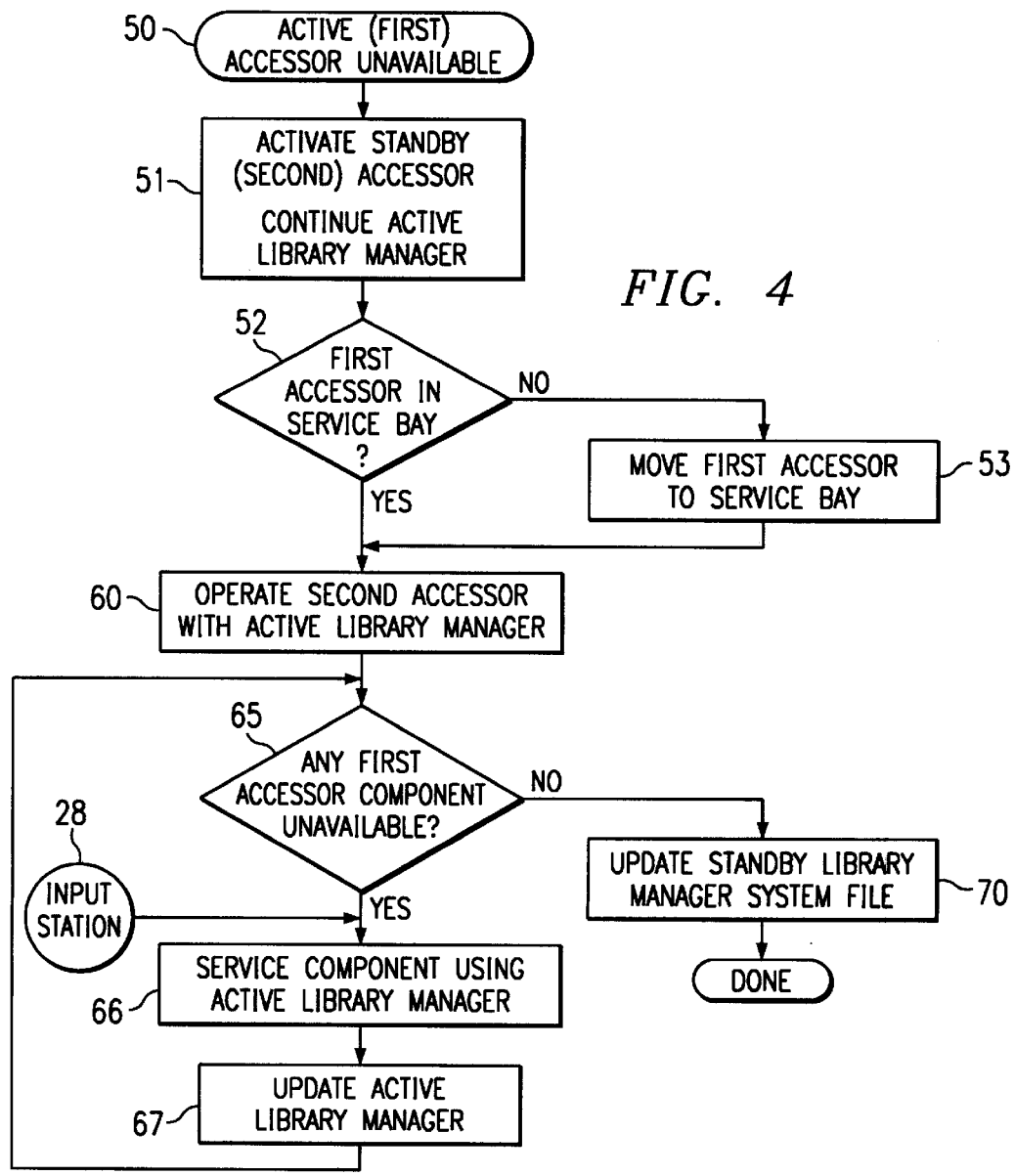
FIG. 4 is a flow chart depicting the method of the present invention.

An embodiment of the method of carrying out the present invention is illustrated in FIG. 4. For ease in understanding, the library managers will be called "active" and "standby" library managers, and the accessors will be called "first" and "second" accessors. It is assumed that the respective library managers have already been designated as "active" and "standby". It is also assumed that the "first" and "second" accessors have been designated "active" and "standby", respectively. For example, with additional reference to FIGS. 1 and 3, it will be assumed that library manager 24 is designated the "active" library manager, and its local accessor 16 is designated the "first" and, initially, the "active" accessor. Therefore, library manager 25 is designated the "standby" library manager, and its local accessor 17 is designated the "second" and, initially, the "standby" accessor. The second accessor 17 is also assumed to be in the "hot standby" state and available to become an active accessor.

At step 50 in FIG. 4, the first, and "active" accessor 16 becomes unavailable. Immediately, in step 51, the second accessor 17 is designated the "active" accessor, and the first accessor 16 is designated the "standby" accessor and is commanded to move to the service bay 44. The first accessor may also be designated as unavailable by the active library manager 24. Key, the active library manager 24 is continued as the active library manager.

Since one of the components of the first accessor 16 that may fail is the running servo section 31, the first accessor may have been unable to execute the command to move to the service bay 44. Hence, step 52 determines whether the first accessor 16 is in service bay 44. If "NO", in step 53 active library manager 24 commands the active second accessor 17 to push the unavailable first accessor out of the aisle and into the service bay 44. If either the result of step 53 or "YES" in step 52, the aisle is clear for second "active" accessor 17.

In step 60, active library manager 24 resumes full operation with second "active" accessor 17.

Active library manager 24, in step 65, begins maintenance and/or service of first "standby" and unavailable accessor 16 under the direction of service personnel simultaneously with continued operation of second accessor 17. In step 65, the active library manager 24 inquires if any component of the first accessor 16 is unavailable, and, if "YES", service personnel can perform various operations on the accessor while it is in the service bay 44, in step 66, under the control of the active library manager 24. The service personnel may communicate with the active library manager 24 via the input station 28. These requests to exercise first accessor 16 in its service bay 44 are handled by the active library manager 24 simultaneously with the active library manager sending requests to the second "active" accessor 17 to perform library operations satisfying host requests.

Referring additionally to FIGS. 1 and 2, the first accessor 16 may be isolated from the aisle by closing barrier door 46. The service door 48 may be opened and power to the accessor may be turned off to provide a service representative with freedom to work on the accessor. The accessor may be exercised with power on by active library manager 24 to diagnose problems or to verify completion of repairs. For example, the accessor may be exercised to operate the running section 31, lifting servo section 35 and any other component individually. The accessor and one of the grippers can be operated to access a "CE" (customer engineer) cartridge in one of CE cells 58. A picker test may be run which exercises the grippers by opening and closing the grippers, by extending and retracting the grippers, and by pivoting the grippers. Also, a frame alignment test may be conducted by running the accessor which operates at test tolerance offsets to insure that the alignment is properly calibrated.

After one or more components are serviced in step 66, the active library manager 24 is updated in step 67 to indicate that the serviced components are now available. The update may be to the system file of the active library manager.

In the embodiment of FIG. 4, step 65 is then repeated, and, if any component remains unavailable, steps 66 and 67 are also repeated. If all components are available, step 65 "NO" leads to step 70 at which the active library manager updates the standby library manager 25 with the status of the components of the first accessor 16. The standby library manager may then update its system file. With all components available, first accessor 16 may be placed in "hot standby" status and made available to replace active second accessor 17 should it fail.

Alternative ordering of the steps of FIG. 4 or omission of some of the steps may be conducted without departing from the present invention.

While the preferred embodiments of the present invention have been illustrated in detail, it should be apparent that modifications and adaptations to those embodiments may occur to one skilled in the art without departing from the scope of the present invention as set forth in the following claims.

We claim:

1. An automated data storage library for storing and accessing a plurality of data storage media stored in a plurality of storage slots, said library having at least one data storage drive for receiving said data storage media and reading and/or writing data thereon, comprising:

first and second accessors for accessing and transporting said data storage media between said storage slots and said data storage drive, said first accessor designated an active accessor and said second a standby accessor; and first and second library managers, said first library manager designated an active library manager and said second a standby library manager, said first and said second library managers respectively associated with said first accessor and said second accessor, for operating said respectively associated accessor, and said first and said second library managers respectively interconnected with said second and said first accessor, for operating said respectively interconnected accessor, said active first library manager operating said first accessor as an active accessor and, upon said first accessor becoming unavailable, immediately operating said second accessor as an active accessor, and allowing performance of maintenance and servicing of said first accessor simultaneously with continued operation of said second accessor.

2. The automated data storage library of claim 1, wherein each of said library managers has a system file with information regarding said accessors, including the operational status of components of said accessors, said library managers are interconnected, and said active library manager communicates to said standby library manager information of the operational status of components of said first accessor as the result of said maintenance and service of said first accessor allowing said standby library manager to update its system file with said information.

3. The automated data storage library of claim 1, additionally comprising an operator input station allowing an operator to communicate with said library managers for entering maintenance and service commands, and wherein said active library manager responds to said commands from said operator input station to command said first accessor to execute said commands.

4. An automated data storage library for storing and accessing a plurality of data storage media stored in a plurality of storage slots, comprising:

at least one data storage drive for receiving said data storage media and reading and/or writing data thereon;

at least one service bay for storing one of said accessors;

first and second accessors for accessing and transporting said data storage media between said storage slots and said data storage drive, said first accessor designated an active accessor and said second a standby accessor; and first and second library managers, said first library manager designated an active library manager and said second a standby library manager, said first and said second library managers respectively associated with said first accessor and said second accessor, for operating said respectively associated accessor, and said first and said second library managers respectively interconnected with said second and said first accessor, for operating said respectively interconnected accessor, said active first library manager operating said first accessor as an active accessor and, upon said first accessor becoming unavailable, immediately operating said second accessor as an active accessor, and allowing performance of maintenance and servicing of said first accessor in said service bay simultaneously with continued operation of said second accessor.

5. The automated data storage library of claim 4, wherein said active library manager commands said first accessor to move to said service bay before performing said maintenance and servicing.

6. The automated data storage library of claim 4, wherein each of said library managers has a system file with information regarding said accessors, including the operational status of components of said accessors, said library managers are interconnected, and said active library manager communicates to said standby library manager information of the operational status of components of said first accessor as the result of said maintenance and service of said first accessor allowing said standby library manager to update its system file with said information.

7. The automated data storage library of claim 4, additionally comprising an operator input station allowing an operator to communicate with said library managers for entering maintenance and service commands, and wherein said active library manager responds to said commands from said operator input station to command said first accessor to execute said commands.

8. A method for maintaining and servicing first and second accessors of an automated data storage library, said first accessor designated an active accessor and said second a standby accessor, said automated data storage library having a plurality of storage slots for storing a plurality of data storage media, having at least one data storage drive for receiving data storage media and reading and/or writing data thereon, and having first and second library managers, said first library manager designated an active library manager and said second a standby library manager, said first and said second library managers respectively associated with said first accessor and said second accessor, for operating said respectively associated accessor, and said first and said second library managers respectively interconnected with said second and said first accessor, for operating said respectively interconnected accessor, said active first library manager operating said first accessor as an active accessor accessing and transporting said data storage media between said storage slots and said data storage drive, said method comprising the steps of:

(A) upon said first accessor becoming unavailable, said active library manager operating said second accessor as an active accessor, and (B) said active library manager allowing performance of maintenance of and servicing said first accessor simultaneously with said operation of said second accessor.

9. The method of claim 8, wherein each of said library managers has a system file with information regarding said accessors, including the operational status of components of said accessors, said library managers are interconnected, and wherein said method additionally comprises the steps of said active library manager communicating to said standby library manager information of the operational status of components of said first accessor as the result of said maintenance and service of said first accessor, and said standby library manager updating its system file with said information.

10. The method of claim 8, wherein said library additionally comprises an operator input station allowing an operator to communicate with said library managers for entering maintenance and service commands, and wherein said method additionally comprises said active library manager responding to said commands from said operator input station by commanding said first accessor to execute said commands.

11. The method of claim 8, wherein said library additionally comprises a service bay and wherein said method comprises the additional step of (B1) moving said first accessor to said service bay.

\* \* \* \* \*